United States Patent
Gros D'Aillon et al.

(10) Patent No.: US 7,378,663 B2
(45) Date of Patent: May 27, 2008

(54) METHOD FOR OPTIMIZING THE PERFORMANCE OF A SEMICONDUCTOR DETECTOR

(75) Inventors: Eric Gros D'Aillon, Brie et Angonnes (FR); Loïck Verger, Grenoble (FR)

(73) Assignee: Commissariat A l'Energie Atomique, Paris (FR)

( * ) Notice: Subject to any disclaimer, the term of this patent is extended or adjusted under 35 U.S.C. 154(b) by 102 days.

(21) Appl. No.: 11/472,957

(22) Filed: Jun. 22, 2006

(65) Prior Publication Data

US 2007/0005271 A1    Jan. 4, 2007

(30) Foreign Application Priority Data

Jul. 1, 2005  (FR) .................................. 05 52015

(51) Int. Cl.
G01T 1/24    (2006.01)
(52) U.S. Cl. .................................... 250/370.1; 378/147
(58) Field of Classification Search ............. 250/370.1, 250/370.11, 370.12, 370.13, 370.14, 370.15, 250/492.1, 492.2, 492.21, 492.22, 492.23, 250/492.24, 492.3, 252.1, 505.1; 378/147, 378/149, 154, 155
See application file for complete search history.

(56) References Cited

U.S. PATENT DOCUMENTS 6,329,651 B1   12/2001   Mestais et al.

2002/0036269 A1 *  3/2002  Shahar et al. ............ 250/370.1

FOREIGN PATENT DOCUMENTS

FR    2 790 560 A1    9/2000

OTHER PUBLICATIONS

Verger, L. et al., "Performance and Perspectives of a Gamma Camera Based on CdZnTe for Medical Imaging," 2003 IEEE Nuclear Science Symposium Conference Record / 2003 IEEE Nuclear Science Symposium and Medical Imaging Conference. Portland, OR, Oct. 19-25, 2003, IEEE Nuclear Science Symposium Conference Record, New York, NY : IEEE, US, vol. 5 of 5, Oct. 19, 2003, pp. 3324-3330.

\* cited by examiner

Primary Examiner—Kiesha Rose
Assistant Examiner—Kiho Kim
(74) Attorney, Agent, or Firm—Burr & Brown

(57)    ABSTRACT

This method for optimizing the performance of a semiconductor detector intended to detect electromagnetic radiation, especially X-rays or γ rays, equipped with electrodes separately mounted on two opposite surfaces of said detector, namely a cathode and a pixelated anode respectively, involves (i) determining the signal that is representative of the sum of the charges detected by all or some of the anodes; and (ii) using the signal that is representative of said sum of the charges to establish one or more biparametric spectra as a function of this signal so as to determine any charge collection loss if charge sharing occurred on the pixelated anodes and, consequently, performing appropriate processing depending on the type of result desired.

9 Claims, 3 Drawing Sheets

METHOD FOR OPTIMIZING THE PERFORMANCE OF A SEMICONDUCTOR DETECTOR

FIELD OF INVENTION

The present invention relates to the field of detecting electromagnetic radiation, especially X-rays and γ rays. The invention uses a semiconductor detector.

More especially, the invention concerns the field of medical and scientific imaging as well as non-destructive tests on structures and the field of security (detection of prohibited or controlled products in baggage and carried by passengers).

Overall, the invention relates to the detection of electromagnetic radiation making it possible to combine high energy resolution performance with equally high spatial resolution performance.

DESCRIPTION OF THE PRIOR ART

The use of semiconductor detectors in the context of detecting electromagnetic radiation is now well-known. Such detectors directly convert incident radiation into energy without having to use any intermediate steps of the visible photon emission type that is familiar in the field of scintillators.

In addition, the energy required to create electrical charges, especially electron-hole pairs, in a semiconductor is much less than that required in a gas or scintillator. Consequently, the number of free charges produced per photon detected is higher, thus making it possible to obtain greater energy resolution with low noise.

Finally, the high atomic number and high density of semiconductor materials make it possible to use detection volumes that are markedly smaller than those of gas-type or scintillation detectors, whilst nevertheless retaining the same quantum detection efficiency.

Using such semiconductor detectors involves applying a bias voltage to the latter via two electrodes that are generally separately mounted on two opposite surfaces of the semiconductor material. This bias voltage creates an electric field capable of causing displacement of the electric charges that result from interaction between incident photons and said semiconductor material. Because of the electric field which results from this bias voltage, the electrons produced are directed towards the anode (positive electrode) and the holes are directed towards the cathode (negative electrode) and their displacements thereby induce charges on the anode(s) and on the cathode.

Having regard to the envisaged applications of such detectors and more especially with a view to achieving imaging by using X or γ radiation, it is first necessary to determine the quantity of charge carriers (electron-hole pairs) created by interaction between each of the X or γ photons and the semiconductor material. It is also necessary to be able to localize this area of interaction accurately. In other words, an attempt is made to obtain optimal resolution both in terms of energy, which therefore directly correlates to the quantity of charge carriers that result from each interaction, and in terms of localizing the impact point of said photons.

When it comes to energy resolution, using a semiconductor material poses a technical problem that is inherent to the material itself. In fact, the ability of charge carriers (electrons and holes) to migrate towards electrodes without becoming trapped by flaws in said material governs the energy resolution of the measured spectrum.

This ability is qualified in practice as the ability to transport charge carriers. It is measured as the mobility and life of said charge carriers in the semiconductor material when it is subjected to the bias voltage mentioned earlier.

Observed flaws in semiconductor materials are now well known. They essentially consist of inclusions, twin crystals, grain boundaries, pipes (hollow tubes), chemical defects (presence of foreign elements, vacancies, etc.), in short, many flaws in which charge carriers and, more especially, holes are likely to be trapped.

Despite the progress made in growing crystals, such native flaws cannot currently be avoided. For example, in a semiconductor detector based on CdZnTe, holes find it difficult to reach the electrodes and, especially, the cathode. On the one hand, this problem of incomplete collection degrades energy resolution, and, on the other hand, also reduces collection efficiency for a given energy.

Experience shows that only electrons manage to migrate long distances, thereby making the signal induced on the anode dependent on the site where they were produced. Among various possible ways of enhancing spatial resolution, it has been proposed to segment the anode in the form of pixels and to reduce the size of said pixels as well as the spacing pitch between two consecutive pixels. The immediate advantage inherent in using a pixelated anode is the "pixel effect" which makes it possible to make the collection of electrons produced by the interaction of photons less dependent on the location where they were produced or, generally speaking, the radiation interaction location. This "pixel effect" is illustrated, for example, in the publication entitled "*Charge Transport in Arrays of Semiconductor Gamma-Ray Detectors*" H. Barret et al, Physical Review Letter, Volume 75, p. 156-159.

Nevertheless, it should be noted that this "pixel effect" has two paradoxical characteristics:
- an imaging system that uses the above-mentioned detector may impose an optimized spatial resolution, and hence a pixel pitch, especially that of the anode, which is not necessarily compatible with efficient correction using the "pixel effect";
- the above-mentioned imaging system may impose a performance, in terms of energy resolution and hence an anode pixel pitch, which is not necessarily compatible with the spatial resolution of the expected system.

Also, in order to compensate for incomplete collection of charges, especially of the holes produced as a result of interaction between incident radiation and the semiconductor material that constitutes the detector, it has also been proposed to use, in addition to simple measurement of the amplitude of the signal on the anode, measurement of one or more other parameters in relation to the waveform of the electrical signal obtained.

These parameters may, for example, consist of:
- the time which the anode signal or the cathode signal takes to reach its maximum amplitude;
- the cathode signal;
- the cathode-to-anode-signal ratio.

Doing this, one obtains a biparametric spectrum that makes it possible to determine the depth of photon interaction in the semiconductor material that constitutes the detector.

Document FR 2 738 919, for example, describes the use of such a method. The correction method described therein is based on extracting two parameters, namely the signal amplitude and signal rise-time, on the basis of the anode signal alone. The biparametric spectrum is then obtained by simultaneously measuring the amplitude and the rise-time of the electrical signal obtained on the output of a charge preamplifier connected to the anode. This data is stored in a two-dimensional histogram that constitutes the biparametric spectrum. However, given the signals that are available, it is possible to obtain other biparametric spectra, in particular spectra based on using the cathode signal in addition to the anode signal.

By way of example, the following biparametric spectra have been proposed:
cathode-to-anode-signal ratio (C/A) or cathode signal (C) as a function of the signal of each anode pixel,
cathode-to-sum-of-anodes-signal ratio (C/SA) or cathode signal (C) as a function of the sum of all the anode signals (SA),
rise-time of cathode signal (TC) as a function of cathode signal (C).

The biparametric spectrum that only uses the anode signal, i.e. uses the duration of the anode signal as a function of the anode signal, has the advantage of depending only on the anode signal. This characteristic makes it possible to use such a spectrum either on detectors referred to as "planar" detectors, i.e. those having two electrodes (an anode and a cathode respectively) that are opposite facing and solid or on monolithic detectors, i.e. those that have a solid cathode and a segmented anode comprising an array of pixels (the cathode can also be pixelated).

In contrast, using such a biparametric spectrum does pose one difficulty: measuring an anode signal rise-time that is accentuated as the pitch of the pixelated anode reduces. The signal that corresponds to the rise-time cannot be measured on monolithic detectors (a solid cathode and a segmented anode comprising an array of pixels) that have a detector-thickness-to-pixel-pitch ratio of less than 2.

Utilizing biparametric spectra that use the cathode and anode signal has the advantage of being practical regardless of the anode pixel pitch because said spectrum depends on the cathode signal only. In contrast, using such spectra has the inherent drawback that the cathode signal very quickly becomes noisy if its surface area is large, i.e. in the case of monolithic detectors having large dimensions.

No matter which biparametric spectra of the above-mentioned type are used, calibrating the efficiency of collection (anode signal) as a function of the interaction depth (rise-time of the anode signal or cathode-to-anode-signal ratio) makes it possible to determine the charge actually deposited by the incident photon, regardless of the interaction location.

Without doubt, simultaneous use of the two techniques above, namely the "pixel effect" and biparametric correction, makes it possible to determine, in a satisfactory manner, correction of the interaction depth of the incident radiation in the detector, this correction being necessary in order to combine energy resolution and detection efficiency.

However, because of the increasingly high performance-requirements placed on detectors, there is pressure to reduce the size of the pixels still further, especially on the anode, and this results in the occurrence of a phenomenon that has a tendency to become more marked: charge sharing which results in deterioration of overall performance of the detector despite using the said techniques.

This charge-sharing phenomenon is described below.

When an X or γ photon is absorbed in a semiconductor material, the resulting interaction creates a cloud of electron-hole pairs. The size of this cloud of charges is chiefly linked to fluorescence of the X photons as a result of the photo-electric effect. Cloud size is also inherent in the distance traveled by the photoelectrons and the Compton effect. The typical dimension of this cloud of charges is several hundred microns.

When this cloud migrates through the detector, it is subjected to a diffusion phenomenon that adds a distance of several dozen to several hundreds of micrometers, depending on the thickness of the detector, depending on the voltage applied to it and depending on the photon interaction depth in the detector. Practical experience shows that this cloud of charges may be shared between at least two anodes if interaction takes place sufficiently close to the boundary between said two anodes. The smaller the dimensions of the anodes, the worse this charge-sharing problem becomes.

It has been demonstrated that, in order to achieve improvement in the performance of the detectors in question, it is actually often desirable to reduce the size of the anodes, thereby making it possible to obtain higher spatial resolutions. If the charge of the pairs of electrical carriers that result from interaction between the photon and the semiconductor material is shared between two or more anodes, the information relating to energy on the one hand and spatial localization on the other hand, as well as the photon interaction depth, is altered or even lost.

It is possible to measure the amplitude of the signal induced on each of the anodes simultaneously. In this way one can conventionally determine an event that is deemed to have resulted in charge sharing if, for several anodes and especially for a least two anodes, the amplitude of the measured signal exceeds a determined threshold. Charge sharing is then defined as the simultaneous measurement of signals that exceeded the threshold in question and was associated with several anodes.

It is easy to grasp that such charge sharing causes a change in the spatial resolution.

In order to compensate such charge sharing, it is possible to envisage:
cancelling those events that resulted in such charge sharing; in this case, such cancellation is to the detriment of detection efficiency which may even become zero for very small pixels; it is readily apparent that such a solution does not further the object sought after by the present invention, namely to optimize the energy and spatial resolution performance of such a detector;
or, alternatively, to sum the amplitudes measured on each of the anodes in order to find the energy of the incident photons. However, this summing does not necessarily correspond to energy of the photons if, because of the difference between surface conductivity and volume conductivity and/or because of trapping of charges close to the surface, charges are actually lost and the sum of the amplitudes remains less than the energy of the absorbed photons. Regardless of the situation with this alternative, there still remains the problem that the measured charge is dependent on the interaction depth.

These various observations show that, in order to achieve optimization of the performance of a semiconductor detector, it is necessary to take into account this charge sharing phenomenon with or without charge collection loss as well as the fact that such charge sharing depends on the interaction depth and, finally, collection loss due to such charge sharing.

SUMMARY OF THE INVENTION

The object of the present invention is to integrate these various data whilst retaining the principle of reducing the dimensions of the anode pixels which, as will be readily understood, facilitates optimizing the spatial resolution of such a detector.

The invention therefore relates primarily to a method for optimizing the resolution of a semiconductor detector intended to detect electromagnetic radiation, especially X-rays or γ rays, equipped with electrodes separately mounted on two opposite surfaces of said detector, namely a cathode and a pixelated anode respectively.

According to the invention, one determines the signal that is representative of the sum of the charges detected by all or some of the anodes. This signal is the result, in particular, of the induction signal that is inherent in migration of the charges generated as a result of interaction between the incident radiation and the semiconductor material that constitutes the detector.

By using the signal that is representative of the sum of the charges detected by all or some of the anodes, one establishes one or more biparametric spectra as a function of this signal so as to determine any collection loss if charge sharing occurred and, consequently, perform appropriate processing depending on the type of result desired.

In other words, the method according to the invention involves:
  determining the signal that is representative of the sum of the charges detected by all or some of the anodes;
  using the signal that is representative of said sum of the charges in order to establish one or more biparametric spectra as a function of this signal,
  and, on the basis of the biparametric spectra thus established, determining any charge collection loss if charge sharing occurred on the pixelated anode.

This signal that is representative of the sum of the charges detected by all or some of the anodes includes firstly those charges that actually reached one or more anodes, i.e. real charges, and secondly so-called induced charges that are of a virtual nature to the extent that they originate from migration of charge carriers in the semiconductor material as a result of interaction between an incident photon and the semiconductor material but disappear once displacement finishes.

These signals are the result of measuring the cathode signal or the anode signal.

The biparametric spectra may be as follows:
  cathode-to-sum-of-anodes-signal ratio (C/SA) as a function of the sum of anodes signal (SA);
  cathode signal ratio (C) as a function of the sum of anodes signal (SA).

In an attempt to reduce the inherent noise of the measurement process, for each event, i.e. for each incident photon, one determines the signal induced on each anode and on the cathode and one compares these signals to a respective predefined energy threshold, beyond which the event in question is ignored.

The respective energy thresholds of the anodes and the cathode are directly linked to the intrinsic performance of the measurement system which is easily determined by those skilled in the art.

The above-mentioned appropriate processing may be one of two types:

In the first case, those events that result from a charge collection loss, identified according to the method described above, are simply cancelled in the final spectrum in order not to affect the energy resolution.

In the second case, one extracts the total energy that corresponds to this particular event from the biparametric spectrum that corresponds to the signal for the rise-time of the cathode signal (TC) as a function of the signal that corresponds to the amplitude of the cathode (C) in order to take it into account when restoring the final spectrum, and subsequently, in order to preserve detection efficiency.

Finally, optimizing the performance of the detector according to the invention may also involve correcting the incident photon's interaction depth in said detector.

BRIEF DESCRIPTION OF THE DRAWINGS

The way in which the invention is implemented and its resulting advantages will be made more readily understandable by the descriptions of the following examples, reference being made to the accompanying drawings.

FIG. 2 shows a biparametric spectrum of the cathode amplitude signal as a function of the signal for the sum of the amplitudes of the collecting anodes of which

FIG. 4 shows a spectrum illustrating the amplitude signal measured on one anode as a function of the amplitude measured on the adjacent anode following a charge sharing phenomenon without charge collection loss and of which

DESCRIPTION OF THE PREFERRED EMBODIMENT

Figure 1:
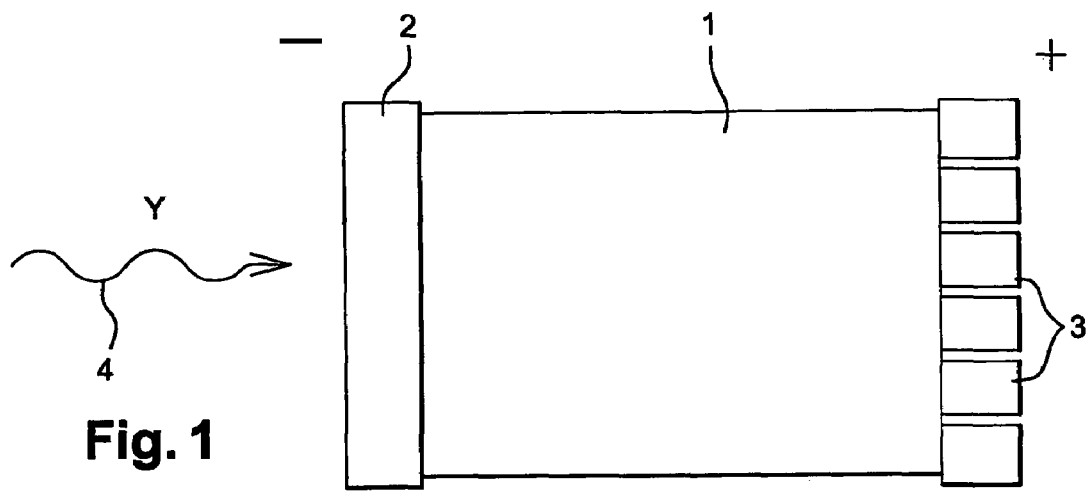
FIG. 1 is a schematic view of a semiconductor detector.

A semiconductor detector as implemented by the present invention is described very succinctly, reference being made to FIG. 1. It comprises a solid semiconductor 1 produced, for example, by crystal growth, made of CdZnTe or CdTe for instance. These materials are currently well known for their ability to convert the energy resulting from an X or γ photon 4 into an electron/hole charge pair.

Electrodes, a cathode 2 and anode 3 respectively, are separately mounted on the two main opposite surfaces of semiconductor 1. One then applies a bias voltage to the semiconductor making it possible to ensure migration of the charges generated following interaction between photon 4 and semiconductor 1.

In addition, on each of the electrodes, one measures a signal, the amplitude of which directly correlates to the quantity of charges thus generated.

Anode 3 is pixelated, one of the objectives of the present dimension being to reduce the dimension of the pixels or the inter-pixel pitch as much as possible in an attempt to optimize the detector's spatial resolution without thereby degrading its energy resolution.

According to a first aspect of the invention, one measures, for each of the photons absorbed by the detector, the signal induced on the cathode and the signal simultaneously induced on each of the anodes (as a result of pixelation). These signals are in fact voltages that each correspond to a collected charge. In turn, these voltages correspond to an energy.

The electronic circuitry associated with the detector compares each of the signals thus measured to an energy threshold beyond which the event that generated said signal is rejected. As already mentioned earlier, these thresholds are defined depending on the detection performance of the measuring system.

In contrast, any signal in excess of this threshold is taken into account when establishing the final spectrum or final image and also, in particular, in order to produce one or more biparametric spectra, as described below.

As stated in the preamble to this description, the various factors that must be taken into consideration in order to optimize the energy resolution of such a detector, whilst preserving a high spatial resolution, include, in particular, phenomena associated with charge sharing and, more especially, electron sharing between two or more anodes, with or without any collection loss of said electrons.

The first task is therefore to identify these charge sharing phenomena then, having identified them, process them taking into account or ignoring any associated charge collection loss. cl Identification and Processing of Charge Sharing Such charge sharing occurs when the anode signals exceed at least two thresholds.

The anode signals are measured simultaneously, thus making it possible to obtain signal SA which corresponds to the sum of the amplitudes of each of the anodes. This sum SA makes it possible to compensate charge sharing without collection loss.

However, experience shows that this signal SA is usually polluted by significant noise because it includes the signals generated by all the anodes, i.e. even those that did not trigger the preset energy threshold once the charges had been collected. This noise associated with measurement of signal SA may become excessive if there is a large number of anodes, i.e. in cases where the pixel pitch is small.

In order to overcome this drawback, the invention proposes to measure signal SA at the start of migration involving the charges generated as a result of interaction between a photon and the semiconductor material 1 in order to localize, as soon as possible, those anodes that will actually be energized. This assumes the use of electronic circuitry making it possible to measure the transient induced signal.

Such a signal is only produced during migration of charges to anodes close to the anode that will collect them. This induced signal is said to be "transient" because it returns to zero as soon as the charges reach the collecting anode.

In other words, pre-localization is performed during charge migration even before charges are collected by the collecting anode. This pre-localization makes it possible to limit the number of anodes involved in determining signal SA and, incidentally, makes it possible to limit the associated noise.

Generally speaking, for photons having the same energy, there is substantially linear correlation between the amplitude of anode signal A and the rise-time of said signal or between the anode signal and the cathode signal and therefore the photon interaction depth in the semiconductor material and hence the correction that needs to be made in terms of energy.

According to the invention, one corrects the interaction depth by establishing the biparametric spectrum of the cathode-to-sum-of-anodes-signal ratio (C/SA) or the cathode signal alone (C) as a function of the sum of the anodes signal SA confined to those anodes that induce a transient signal, i.e. only the collecting anodes. This correlation has been described in the following publications for example:

"1-D position sensitive single carrier semiconductor detectors"—Z. He et al—Nuclear Instruments and Methods—A 380 (1996) 228-231;

"Spectroscopy with pixelated CdZnTe gamma detectors—experiment versus theory"—A. Shor et al—Nuclear Instruments and Methods—A 458 (2001) 47-54.

Figure 2:
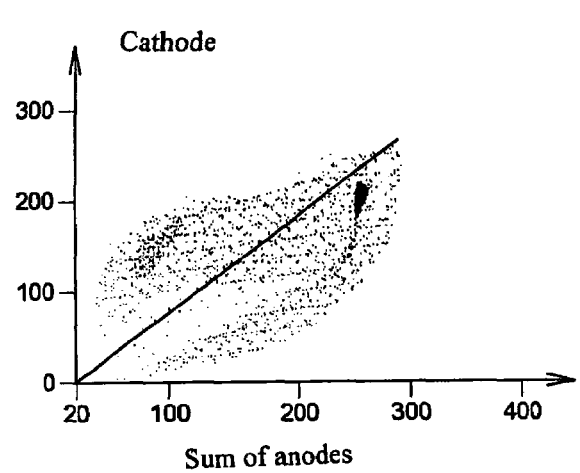

FIG. 2 shows the biparametric spectrum for the cathode signal C as a function of the signal that represents the sum of the anodes SA.

In this Figure, the diagonal line that passes through the origin corresponds to interactions close to the cathode, i.e. at the detector's maximum depth.

For each of the interactions that occur in the detector and which are materialized by the points located below this diagonal line, one can see a correlation between signal SA and the amplitude of the signal measured on the cathode due to the fact that the induced amplitude depends on the interaction depth.

The amplitudes thus measured correspond to clouds of charges that were not shared (case 1) or shared (case 2) with no charge collection loss and correlating them with the cathode signal makes it possible to display and then correct their dependence on interaction depth. These two hypotheses (case 1 and case 2) are represented by the iso-energetic lines in FIG. 3 which is a more practical analysis of the spectrum in FIG. 2.

Figure 3:
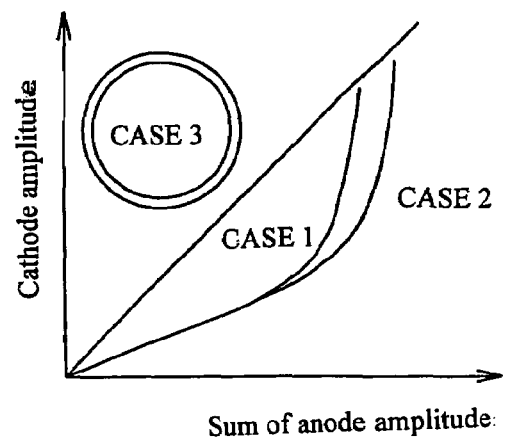
FIG. 3 is an analysis.

In contrast, all the points above the diagonal line in the spectrum that are identified by the circle (case 3) in FIG. 3 are the result of interactions for which signal SA does not correlate with cathode signal C and were therefore incorrectly measured: these are interactions which caused charge sharing with charge collection loss.

Two working options can be envisaged for each of these points.

If one wants to give preference to energy resolution, these points are omitted from the final spectrum. In contrast, if one gives priority to efficiency in terms of detection and therefore events, these events must be taken into account but corrected as defined below.

Correction of Charge Sharing Collection Loss Using Cathode Signal

One uses the signal, and therefore the energy measured simultaneously on the cathode to achieve this, for instance by using a biparametric spectrum for the rise of the cathode signal as a function of the cathode signal.

In fact, when charges are trapped close to the anodes, the total charge induced on the cathode is not affected excessively because the cathode includes a large proportion of the movement of charges. These events are taken into account in order to favor detection efficiency and the interaction depth is corrected by using the TC vs C (rise-time of cathode signal as a function of cathode signal) biparametric spectrum as explained in the above-mentioned publications.

Correction of Charge Sharing Collection Loss Using Anode Signal

In an alternative solution, the interaction depth can be corrected by using the anode signal.

If the charges resulting from an interaction are shared between two pixels, the amplitude of these two signals are measured simultaneously, i.e. the amplitude on both two anodes.

To characterize this charge sharing, one plots a graph that represents the amplitude measured on pixel 1 as a function of the amplitude measured on pixel 2 for the shared events.

In theory, these points are aligned along a segment that joins the two crosses shown in these graphs.

If all the incident photons have the same energy and if one ignores the measured amplitude's dependency on the interaction depth, charge loss and noise, the sum of the amplitudes thus determined must be constant. Summing the amplitudes gives the energy of the incident photons. This measurement makes it possible to characterize charge sharing and find the incident energy spectrum.

Figure 4:
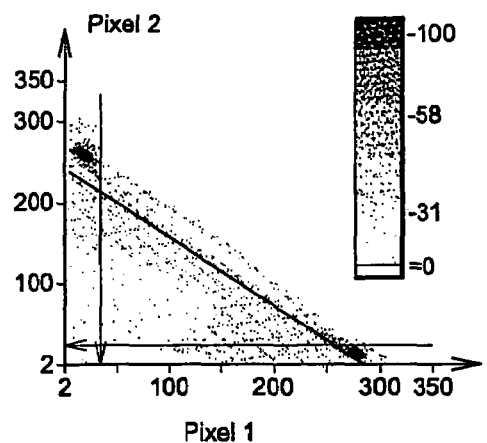
Figure 5:
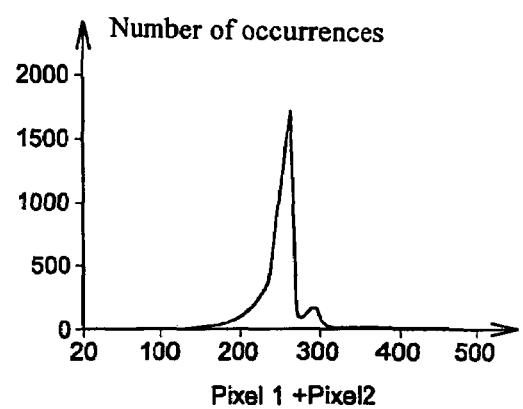
FIG. 5 is the associated energy spectrum.

In practice, one must add the noise of each measurement as well as the measured amplitude's dependency on interaction depth. This gives a plot of the type shown in FIG. 4 obtained for a CdZnTe-based detector subjected to a bias voltage of 400 V. In this Figure, the sloping line links the amplitude measured at 122 KeV for both the pixels in question. Obviously, there is a high detection concentration at the level of each of the two pixels.

With the aid of this measurement, the energy spectrum can be produced by using the counts opposite the vertical line and above the horizontal line. These two lines correspond to the threshold below which the charges are regarded as being shared.

In this respect, it should be noted that this type of acquisition can be used to determine the threshold to be applied, as mentioned above.

Figure 6:
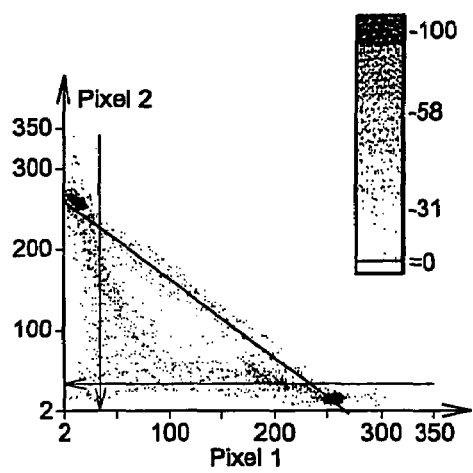
FIGS. 6 and 7 are views similar to FIGS. 4 and 5, but with charge collection loss.
Figure 7:
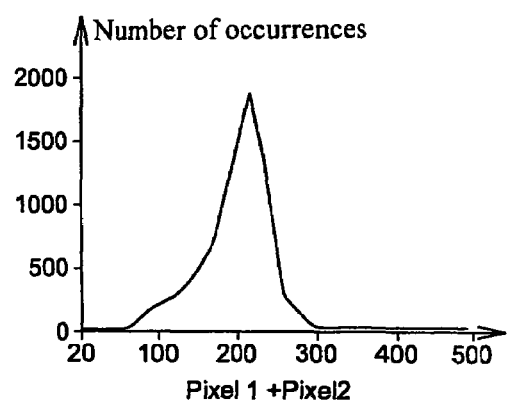

In this particular case, the sum of the amplitudes of the two pixels can be used to process shared events. However, for this same detector, it is apparent that the results obtained between two other pixels do not match the theory so closely (FIG. 6). In this other case, "curved" charge sharing is measured and this gives an energy spectrum with very poor resolution (FIG. 7).

Identifying and taking into account these curves between each anode at the time of acquisition for preliminary calibration makes it possible to correct the count, thereby improving detection efficiency.

Figure 8:
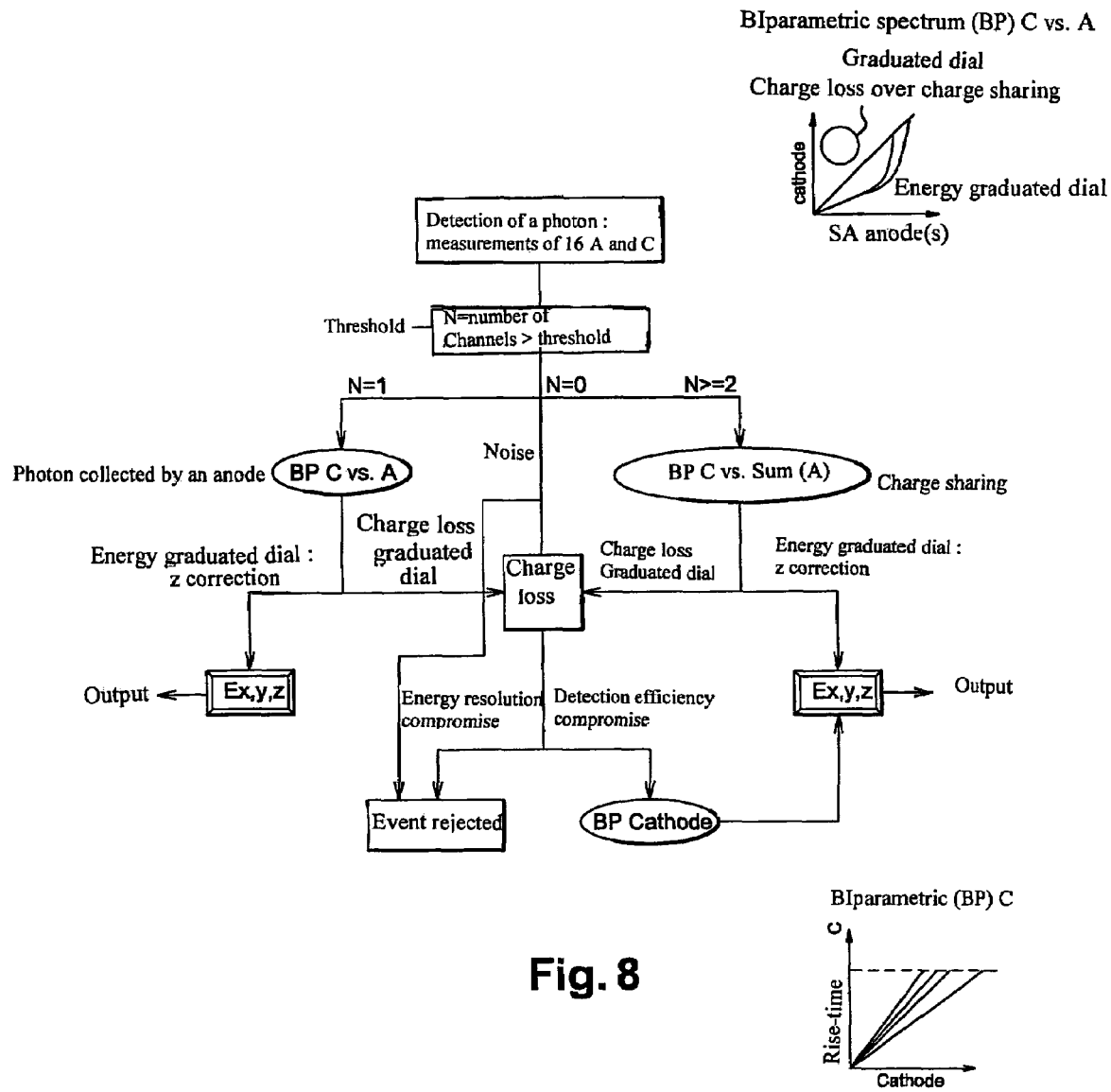
FIG. 8 is a flowchart intended to show the method of managing the events detected according to the invention by means of a semiconductor detector.

FIG. 8 is a flowchart intended to show a method of managing events obtained by means of a semiconductor detector that uses a 16-pixel pixelated anode, especially if there is considerable charge sharing.

The example given is based on measuring the anode signals (A), measuring the signal of the sum of the collecting anodes (SA), measuring the cathode signal (C) and the rise-time of the cathode signal (TC) in order to be able to construct the C vs A, C vs SA and TC vs C biparametric spectra directly.

In this Figure:
N represents the number of channels, i.e. the number of anode signals above the defined energy threshold;
BP denotes the biparametric spectrum;
z corresponds to the interaction depth in the detector, measured from the cathode.

Obviously, the corrections that are mentioned are made by using dedicated electronic circuitry. Also, management of actual detection which is regarded as well-known by using preamplifiers, filters and other electronic components is not described here because it is considered to be familiar to those skilled in the art.

The invention claimed is:

1. A method for processing data obtained by means of a semiconductor detector intended to detect electromagnetic radiation, especially X-rays or γ rays, said detector being equipped with electrodes separately mounted on two opposite surfaces of said detector, namely a cathode and a pixelated anode respectively, wherein:
one determines the signal that is representative of the sum of the charges detected by all or some of the anodes;
and wherein the signal that is representative of said sum of the charges is used in order to establish one or more biparametric spectra as a function of this signal,
and wherein, on the basis of the biparametric spectrum or spectra thus established, one determines any charge collection loss if charge sharing occurred on the pixelated anode.

2. A method for processing data as claimed in claim 1, wherein, depending on the determination of any charge collection loss on the pixelated anode, one uses appropriate processing depending on the type of result desired in terms of detection.

3. A method for processing data as claimed in claim 1, wherein, for each event, i.e. for each incident photon, one determines the signal induced on each anode and on the cathode and one compares these signals to a respective predefined energy threshold, beyond which the event in question is ignored.

4. A method for processing data as claimed in claim 1, wherein the detector is equipped with a cathode that is also pixelated.

5. A method for processing data as claimed in claim 1, wherein the signal that is representative of the sum of the charges detected by the anodes is determined by measuring the induced signal inherent in migration of the charges generated as a result of interaction between the incident radiation and the semiconductor material that constitutes the detector.

6. A method for processing data as claimed in claim 1, wherein the biparametric spectra obtained and used are selected from the following spectra:
cathode-to-sum-of-anodes-signal ratio (C/SA) as a function of the sum of anodes signal (SA);
cathode signal ratio (C) as a function of the signal that is representative of the sum of the anodes (SA).

7. A method for processing data as claimed in claim 6, wherein the appropriate processing in order to take into account an event that involved charge sharing with charge collection loss involves cancelling the event that corresponds to the level of the spectrum, measurement or final restoration.

8. A method for processing data as claimed in claim 6, wherein the appropriate processing in order to take into account an event that involved charge sharing with charge collection loss involves extracting from the biparametric spectrum that corresponds to the signal for the rise-time of the cathode signal (TC) as a function of the cathode amplitude signal (C) the total energy corresponding to this particular event and taking it into account when restoring the spectrum or measurement or final restoration in order to preserve the efficiency of the detector in terms of detection.

9. A method for processing data as claimed in claim 1, wherein by using signals that are representative of the sum of the charges detected by all or some of the anodes and biparametric spectra established as a function of the latter, one determines the correction to be applied to the interaction depth of the incident photons detected.

* * * * *